Aug. 25, 1953 W. F. LILLEY ET AL 2,649,909
APPARATUS FOR TRIMMING WRAPPED OBJECTS
Filed Sept. 11, 1948

INVENTORS
WILLIAM F. LILLEY
JAMES E. SNYDER
JOSEPH F. STALTER

ATTORNEY

Patented Aug. 25, 1953

2,649,909

UNITED STATES PATENT OFFICE 2,649,909

APPARATUS FOR TRIMMING WRAPPED OBJECTS

William F. Lilley, James E. Snyder, and Joseph F. Stalter, Akron, Ohio, assignors to Wingfoot Corporation, Akron, Ohio, a corporation of Delaware Application September 11, 1948, Serial No. 48,848

6 Claims. (Cl. 164—34)

The present invention relates to wrapping machines and particularly to that class of machines employing a heat sealable film for the wrapping material such as rubber hydrochloride. A particular object of the invention is to provide means for removing the surplus web of wrapping material surrounding the article after the wrapping operation has been completed.

Another object of this invention is to provide a method for removing the surplus film of wrapping material surrounding the object by a trimming device that substantially follows the contour of the object, irrespective of the object's shape, the trimming means being controlled preferably by the contour of the article.

Another object of the invention is to provide a means of removing the surplus film of wrapping material by a heated cutting element guided to follow the contour of the object.

Various machines have been devised for wrapping articles in heat sealable film and one of these is illustrated in the Clunan Patent No. 2,340,260. In wrapping machines of this type, the objects are interposed between two layers of the film and then the layers of the film are pressed around the object and sealed together, thus completely enclosing the objects in a continuous strip of the film from which the objects have to be separated. It is, therefore, a primary object of this invention to provide a means for accomplishing this result mechanically immediately following the wrapping operation to successively separate the wrapped articles.

Other objects of this invention will appear hereinafter as the description thereof proceeds, the novel features, arrangement and combination being clearly pointed out in the specification and in the claims thereunto appended.

Figure 1:
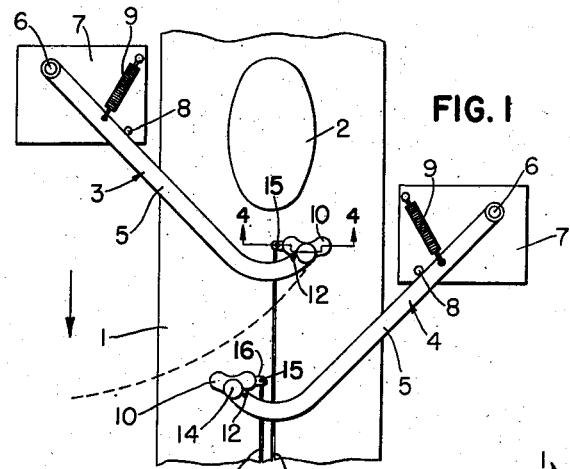
Fig. 1 is a fragmentary plan view showing the trimming means in the normal inoperative position.

In Fig. 1, the strip 1, comprised of two layers of wrapping material with the objects 2 interposed between, is advancing toward the trimming means consisting of coacting assemblies 3 and 4 here shown disposed on opposite sides of the path of travel of the strip 1. The same reference characters indicate corresponding parts of these cutting mechanisms.

Figure 4:
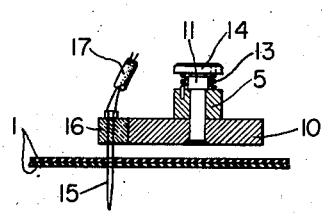
Fig. 4 is a cross-sectional view taken along the line 4—4 on Fig. 1.

The arm 5, rotating about stationary pivot 6, mounted on plate 7, is normally held against stop 8 by tension spring 9 fastened to the arm 5 and plate 7. The arm 5, as shown, is generally straight but the end is arcuately shaped inwardly toward the object to prevent the arm from contacting the wrapped object but may be any structure or shape that will prevent the arm from contacting the object. The arcuate end of arm 5 carries the follower 10, secured to and rotatable with the pin 11, as shown in Fig. 4, and is normally held against stop 12 by the torsion spring 13 (Fig. 4). In assembly 3, the torsion spring 13, surrounding the pin 11, is connected at its ends to the cap 14 of the pin and the arm 5 in such manner as to rotate the follower 10, as viewed in Fig. 1, in a counter-clockwise direction to its normal position against the stop 12. The spring 13 will allow the follower 10 to rotate clockwise so as to follow the contour of the object during the trimming operation but will return it to the normal position again when the trimming operation is complete. The follower 10 on arm 5 of assembly 4 functions similarly but the spring 13 tends to rotate the follower 10 in a clockwise direction to its normal position.

The cutter 15, attached to the follower 10, is a flat narrow loop formed of closely-spaced parallel wires, even more closely spaced than shown in the drawing. These extend through the insulating material 16 and are connected to a suitable source of electrical energy (not shown) by the wire connections 17. The wires of the loop 15 are so arranged as to be substantially equidistant from the object as the follower 10 progresses along the periphery of the object 2, shown in Fig. 2, thus the diameter of the wire is the width of the cut in the film. When the follower 10 is in the normal inoperative trimming position, shown in Fig. 1, the width of the cut is determined by the spacing of the sides of the loop 15. Any other form of heated cutting element may be used, and, with certain wrapping materials, an unheated cutting element may be sufficient.

Figure 2:
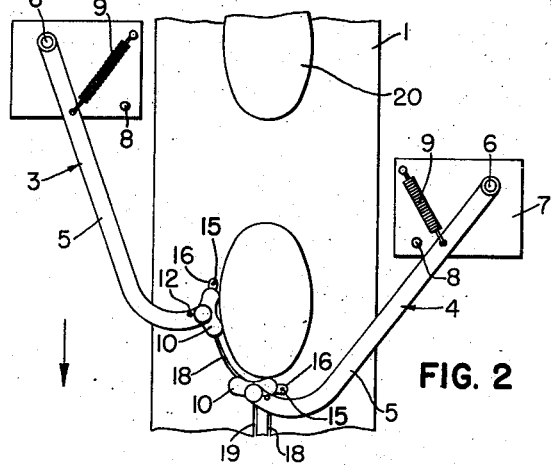
Fig. 2 is a fragmentary plan view showing the position of the trimming means at a successive stage of the trimming operation.
Figure 3:
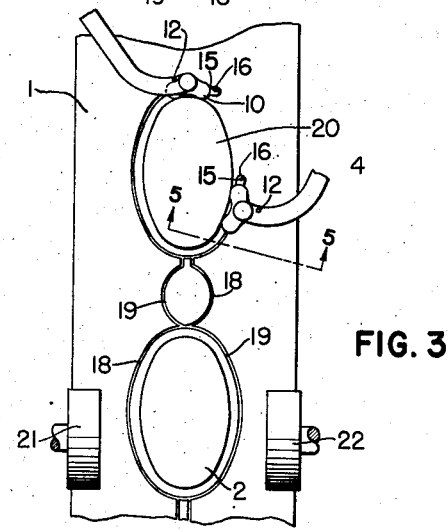
Fig. 3 is a fragmentary plan view showing the position of the trimming means at a more advanced stage of the trimming operation.

In Figs. 1, 2, and 3, the cutters 15 of assemblies 3 and 4 substantially follow the paths indicated by the numerals 18 and 19, respectively. In Fig. 2, the strip 1 with the wrapped objects 2 and 20 interposed between its layers, is shown with the follower 10 and cutter 15 of assembly 3 in the operative stage of trimming the strip 1 around the object 2 at a predetermined distance from it. The follower 10 of assembly 4 is just contacting the object 2 and about to become operative. In Fig. 3, the wrapped object 2' has been separated from the strip 1 of wrapping material and the next object 20 is now being separated. In Fig. 3, the assembly 3 has completed its portion of the trimming operation and the assembly 4 is operative in completing its portion of the operation. Note that the cutting lines of the assemblies 3 and 4 cross so as to completely separate the objects from the strip. The film may be held under slight tension by any suitable means, but, as illustrated, the tension is maintained by two pairs of driven tentering rolls 21 and 22, as illustrated in Fig. 3. Such mechanisms, in and of themselves, are not new and it is not believed necessary to illustrate any details thereof.

Figure 5:
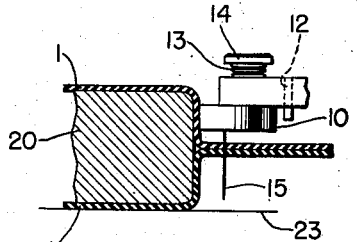
Fig. 5 is a cross-sectional view taken along the line 5—5 on Fig. 3.

In Fig. 5, the wrapped object 20 is being separated from the strip 1 by the cutter 15 of assembly 4, severing the strip 1 at sufficient distance from the object 20 so as not to destroy the seal between the layers of the strip 1. The follower 10 is in contact with the object 20 and the cutter 15 is extended through the film.

Due to the variations in the heights of the different objects wrapped, the location of the strip 1, relative to the supporting member 23, as seen in Fig. 5, will vary so that the cutter 15 will not always be in the proper relative position to sever the strip 1. The length of the cutter 15 will take care of the minor variations but in order to handle any major variations, it is desirable that the position of the cutter 15 may be adjusted so as to correspond to the position of the strip 1. For example, this can be accomplished by mounting the plates 7 of the cutting assemblies 3 and 4 for vertical adjustment.

In the operation of the trimming means, as the strip 1, with the object contained between its layers, progresses through the machine, the assembly 3 of the cutting means first becomes operative as the follower 10 contacts the object 2 and the arm 5 deflects clockwise about pivot 6, aiding the follower 10 and cutter 15 to follow the periphery of the object 2 and sever the strip 1 closely adjacent to the object without destroying the seal between the layers. The tension spring 9 and the torsion spring 13 function so as to make the arm 5 and follower 10 hug the periphery of the object 2 and leave a uniform trim flash of film adjacent to the wrapped object, the cutter 15 substantially following the path 18. Similarly, the assembly 4 operates to sever the film on the opposite side of the object 2, but the arm 5 is deflected counterclockwise about pivot 6 when the follower 10 contacts the object and the tension spring 9 and the torsion spring 13 operate in a reverse direction to those of assembly 3, the cutter 15 substantially following the path 19. The objects are completely separated from the continuing strip of wrapping material as illustrated by object 2 in Fig. 3.

While certain representative embodiments and details have been shown for the purpose of illustrating the invention, it will be apparent to those skilled in the art that various changes and modifications may be made therein without departing from the spirit or scope of the invention.

Having thus fully described our invention, what we claim and desire to secure by Letters Patent of the United States is:

1. A trimming mechanism adapted to be mounted adjacent a conveyor element in a wrapping machine which comprises a pivoted arm, means for normally limiting the movement of said arm in one direction about its pivot, means for normally urging said arm in a direction to bring said arm against said first-mentioned means, a pivoted follower on the end of said arm, a cutting element carried by said arm and movable therewith, a stop for normally limiting the movement of said follower in one direction about its pivot, and a spring normally urging said follower in a direction to bring said follower against said stop.

2. A device as set forth in claim 1 in which there are a pair of said mechanisms mounted on opposite sides of the path of movement of the conveyor.

3. A trimming mechanism adapted to be mounted adjacent a conveyor element in a wrapping machine which comprises a pivoted arm, means for normally limiting the movement of said arm in one direction about its pivot, means for normally urging said arm in a direction to bring said arm against said first-mentioned means, a pivoted follower on the end of said arm, a heated cutting element carried by and movable therewith, a stop for normally limiting the movement of said follower in one direction about its pivot and a spring normally urging said follower in a direction to bring said follower against said stop.

4. A trimming mechanism adapted to be mounted adjacent a conveyor element in a wrapping machine which comprises a pivoted arm, a stop for normally limiting the movement of said arm in one direction about its pivot, a spring normally urging said arm in a direction to bring said arm against said stop, a pivoted follower on the end of said arm, a heated cutting element carried by said arm and movable therewith, a stop for normally limiting the movement of said follower in one direction about its pivot, and a spring normally urging said follower in a direction to bring said follower against said stop.

5. A device as set forth in claim 4 in which there is a pair of said mechanisms mounted on opposite sides of the path of the movement of the conveyor.

6. A device as set forth in claim 4 in which there is a pair of said mechanisms mounted on opposite sides and at different positions along said path so that the paths of the cutting elements overlap.

WILLIAM F. LILLEY.
JAMES E. SNYDER.
JOSEPH F. STALTER.

References Cited in the file of this patent

UNITED STATES PATENTS

| Number | Name | Date |
|---|---|---|
| 658,711 | Forker | Sept. 25, 1900 |
| 680,927 | Krom | Aug. 20, 1901 |
| 701,828 | Arnold | June 10, 1902 |
| 881,899 | Chapman | Mar. 17, 1908 |
| 1,179,493 | Ball | Apr. 18, 1916 |
| 1,724,208 | Lewis | Aug. 13, 1929 |
| 1,762,826 | Lehman | June 10, 1930 |
| 1,790,048 | Hutt et al. | Jan. 27, 1931 |
| 1,813,761 | Pickett | July 7, 1931 |
| 2,048,684 | Carr | July 28, 1936 |
| 2,232,783 | Hausheer | Feb. 25, 1941 |

FOREIGN PATENTS

| Number | Country | Date |
|---|---|---|
| 436,774 | Germany | Feb. 10, 1926 |